R. F. TAYLOR & W. W. WHEATLY.
APPARATUS FOR PRODUCING MOTION PICTURE PUPPET PLAYS.
APPLICATION FILED NOV. 10, 1915.
1,275,496.
Patented Aug. 13, 1918.
3 SHEETS—SHEET 1.
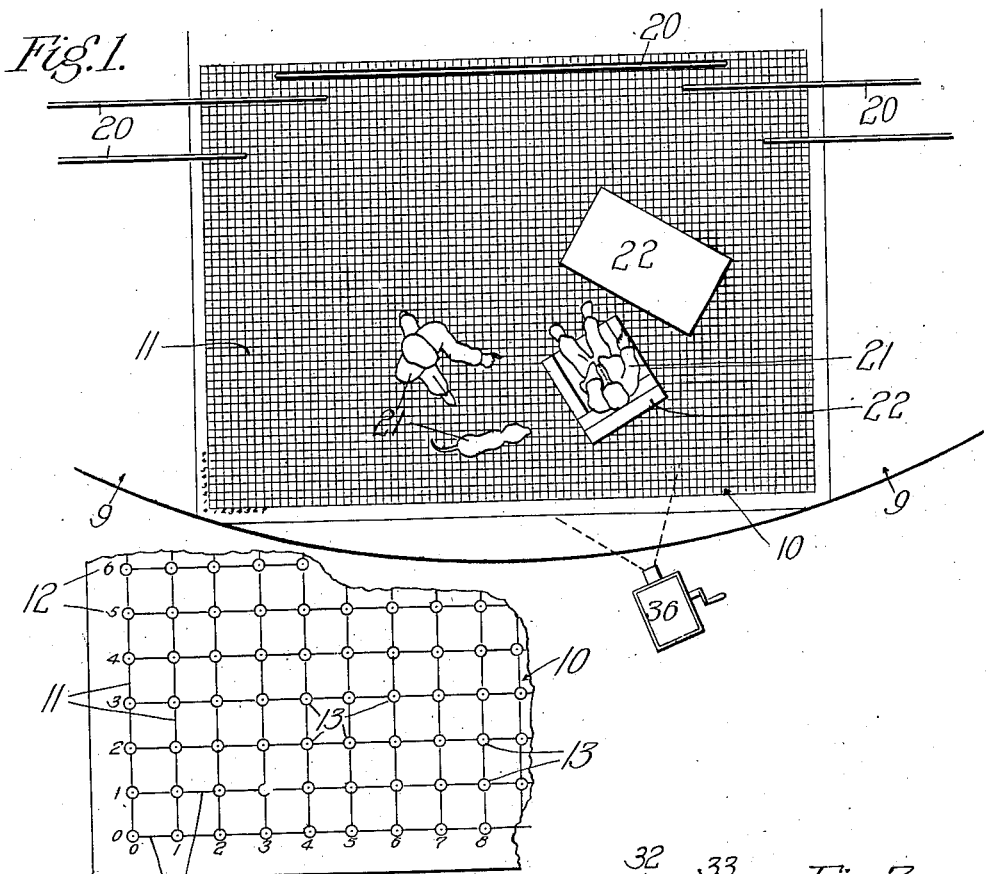
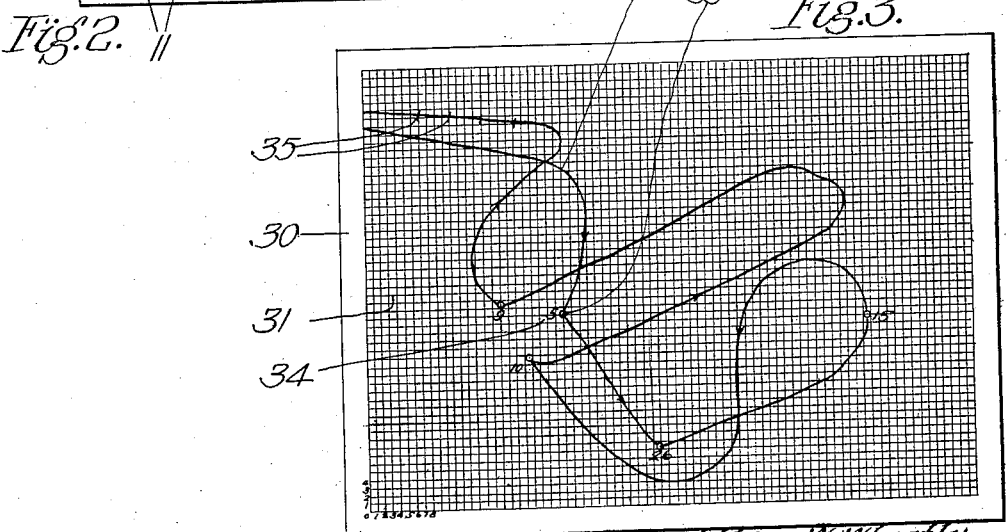

R. F. TAYLOR & W. W. WHEATLY.
APPARATUS FOR PRODUCING MOTION PICTURE PUPPET PLAYS.
APPLICATION FILED NOV. 10, 1915.
1,275,496.
Patented Aug. 13, 1918.
3 SHEETS—SHEET 2.
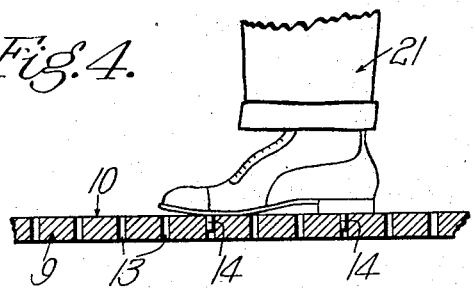
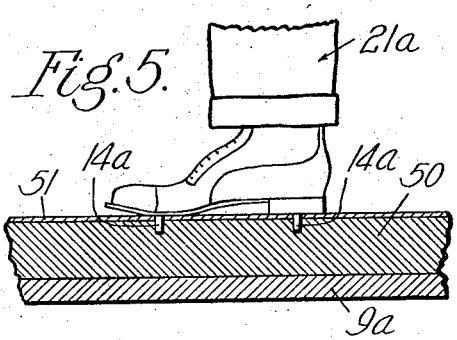
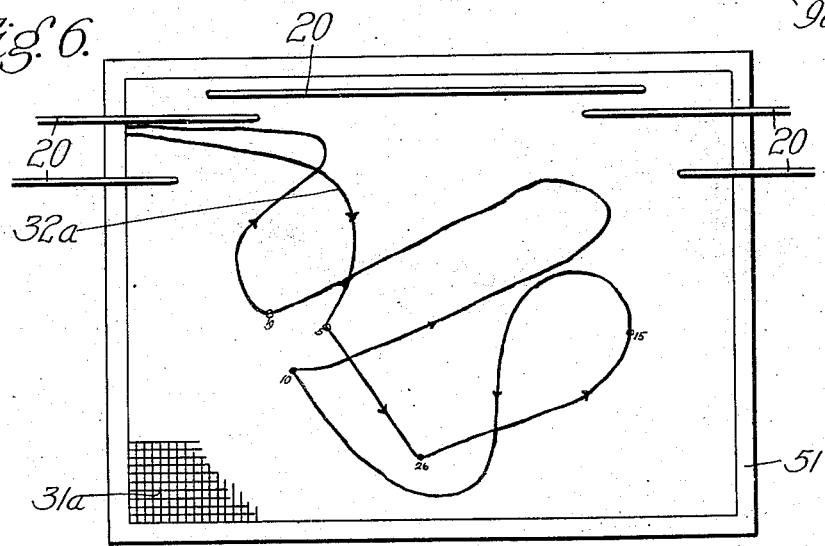
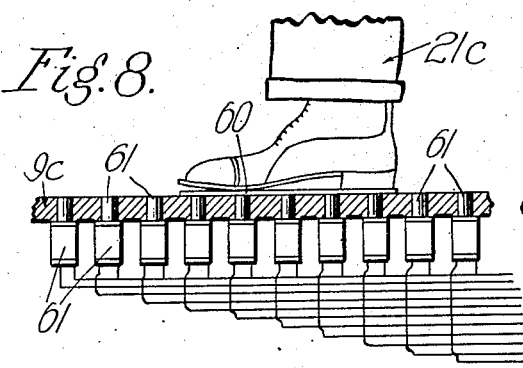
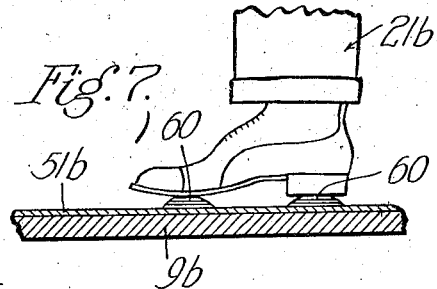

R. F. TAYLOR & W. W. WHEATLY.
APPARATUS FOR PRODUCING MOTION PICTURE PUPPET PLAYS.
APPLICATION FILED NOV. 10, 1915.
1,275,496.
Patented Aug. 13, 1918.
3 SHEETS—SHEET 3.
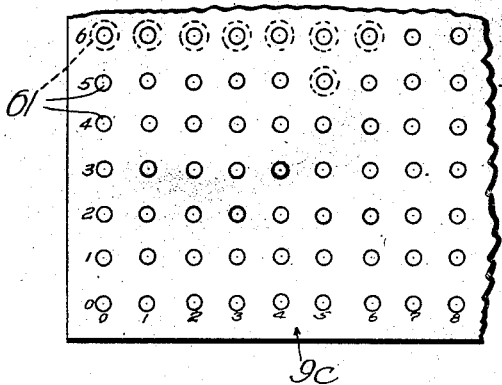
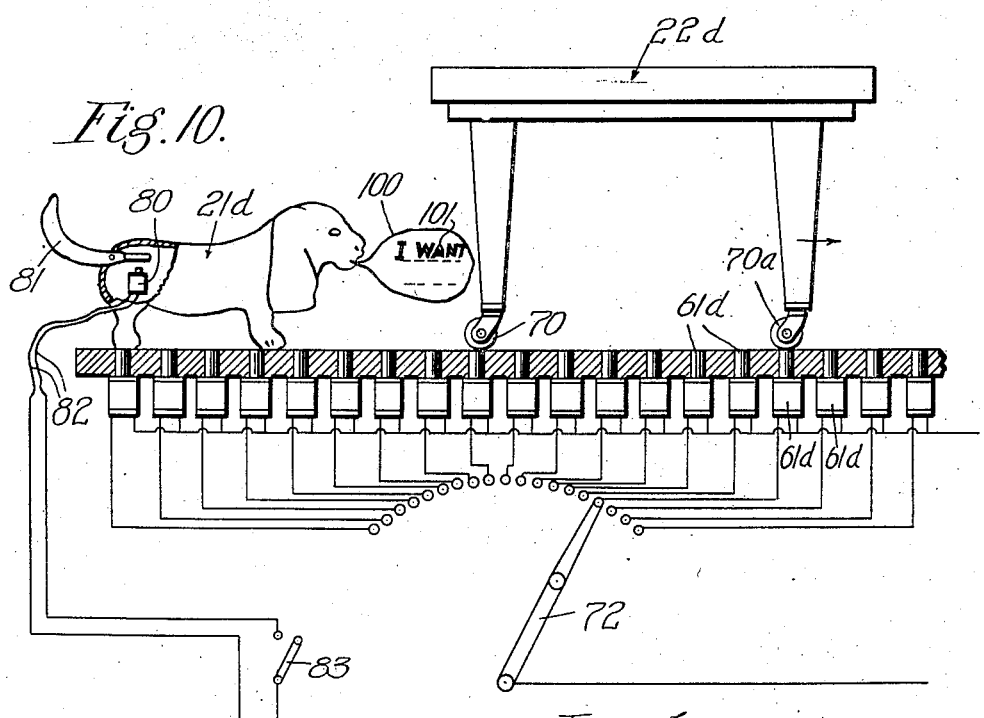

UNITED STATES PATENT OFFICE.

RIDLEY F. TAYLOR AND WILKINS W. WHEATLY, OF LOS ANGELES, CALIFORNIA, ASSIGNORS, BY MESNE ASSIGNMENTS, TO WILLIAM HORSLEY, OF LOS ANGELES, CALIFORNIA.

APPARATUS FOR PRODUCING MOTION-PICTURE PUPPET-PLAYS.

1,275,496.  Specification of Letters Patent.  Patented Aug. 13, 1918.

Application filed November 10, 1915. Serial No. 60,760.

*To all whom it may concern:*

Be it known that we, RIDLEY F. TAYLOR and WILKINS W. WHEATLY, citizens of the United States, residing at Los Angeles, in the county of Los Angeles, State of California, have invented new and useful Improvements in Apparatus for Producing Motion-Picture Puppet-Plays, of which the following is a specification.

This invention relates to a method and mechanism and apparatus for producing motion pictures, and particularly for producing motion picture puppet plays; and this application refers more particularly to the mechanism and apparatus of production, another application Serial No. 60,759, filed Nov. 10, 1915, co-pending herewith, relating more particularly to the method.

Our invention has for its primary object the practicable and easy production of motion pictures from inanimate objects which are moved under the control of the director, in contra-distinction to motion pictures made from living moving persons or animals; and it is an object of this invention to provide a practicable method for taking motion pictures from inanimate objects, such as puppets in general, manikins, and representations of animals, etc., and representations of other objects, or the objects themselves, which may be moved from place to place according to a certain pre-determined plan. It is also a particular object of this invention to provide a practicable and easy method of producing such motion pictures as are now called motion picture "cartoons." Such motion picture cartoons have heretofore been made by laborious and exacting methods, involving the production of an enormous number of drawings, showing the objects in necessarily a very great number of different positions. With our method and apparatus we produce such a motion picture play, which we may term a puppet play, with a minimum of effort and labor and in minimum time; all of which is hereinafter explained in detail.

Our method, fundamentally involves the movement of the objects or component parts of the scene, such as the puppets, manikins, etc., step by step, and the exposure of the motion picture film step by step or picture by picture after each movement of the object or objects; that is, the moving objects are moved by a certain pre-determined amount, and one or more exposures of the film follows each movement of the object or objects. The amount of movement in each case will depend upon the speed at which it is desired to have the objects appear to travel in the final moving picture. We set forth preferred forms of the mechanism and apparatus in the following specification, together with a detailed description of the method; and in the accompanying drawings we have illustrated these preferred forms of our invention, in which drawings Figure 1 is a plan showing a typical arrangement of scenery and typical objects, etc., and motion picture camera for carrying out our method; Fig. 2 is a detail plan of the floor or reference plane over which a movable object may be moved, Fig. 3 is a plan showing a planning sheet on which the movement of various objects may be preliminarily plotted, Fig. 4 is a detail section showing one of the methods of support and registration for a movable object, Fig. 5 is a detail section showing a modified means for support and registration of a movable object, Fig. 6 is a plan showing the means of registration shown in detailed form in Fig. 5, Fig. 7 is a detail section showing another means of support of a movable object, Fig. 8 is a detail section showing another means of support and registration of a movable object, Fig. 9 is a plan of the floor or reference plane shown in Fig. 8 and Fig. 10 is a diagram illustrating a typical means for moving and registering a movable object by electro-magnetic means.

We will first explain our method and apparatus with reference particularly to Figs. 1 to 4, and will then explain the different modifications illustrated in the other figures.

In Fig. 1 we have illustrated a floor, such as a stage floor 9 (or any other surface or suitable support which may be used, the ground being used in out door representations) and this floor or surface is provided with an upper reference plane 10 which, in the present case, may be provided with coördinate reference marks 11 at right angles to each other, and numbered as at 12; so that these reference marks become means of locating any particular mark upon the reference plane of the floor. In the form shown in Fig. 1 we provide the floor with perforations 13, one at each intersection of the reference marks; and the puppets or other objects are provided with pins or studs 14 on their under surfaces adapted to enter the perforations 13 so as to hold the puppets or other objects at any particular set position upon the floor. It will be understood that the reference marks or lines may be laid off according to any desired system, as may also the perforations 13; as other systems or spacings of the perforations will suit some situations better than the square spacing. It is not necessary that the perforations or the reference marks be laid off regularly; it is only necessary that they be laid off in a known manner, so that positions may be ascertainable by their use.

In Fig. 1 we have shown certain back ground scenery 20, which may be such as desired, to form the back ground for the pictures. Puppets 21, and representations of other objects, as at 22, may be placed upon the floor and supported in the manner indicated, (or in other manners as hereinbefore set forth). By the aid of the registration marks and the supporting means the objects may be placed and supported in any desired exact position upon the floor and may be moved from one position to another; and the exact relation between the different objects may always be accurately known.

For instance, in producing a motion picture puppet play, a plan sheet, or a number of plan sheets, such as shown in Fig. 3 may be laid out. These plan sheets 30 will be marked with lines 31 corresponding to the marking 11 on the actual plane of reference, and will also be numbered correspondingly. The line of motion of the puppets, objects, etc., may be marked out on the reference sheet, as shown at 32 in Fig. 3. At each point of stoppage of an object a suitable mark, such as shown at 33, may be made; and the length of time (say, in units of single exposures) may be noted adjacent each stoppage point, as at 34. The position after successive movements of any object may also be noted on the line of movement, as by the marks illustrated at 35; and the length of these individual movements will determine the apparent speed at which the object moves in the finished motion picture. The whole object having been planned, the scenery and objects are originally set up; and when all is ready the first single exposure of the motion picture film is made by suitable operation of the camera 36. The single exposure having been made, each of the objects, puppets, etc., are moved to their next position and another exposure made, and so on, until the entire action is completed, the objects being moved a step at a time and exposures made while the objects are at rest between steps of movement, one exposure for each movement. Or, where it is desired to have puppets appear at rest for a period, the camera is operated a number of times between two successive movements.

It is a particular advantage of this invention that it takes the place of the formerly laborious method of producing motion picture "cartoons." In the former production of such motion pictures, immense numbers of drawings must be made and each must be made with great care and precision. In our method the puppets are designed or selected as desired to represent any object, animal or person and are then put through the action in the manner above described. In addition to the puppets and objects being moved about the stage, they can, of course, be moved in themselves to effect different attitudes, expressions and gestures, etc. The details of construction of such puppets need not here be entered into, being well known to the art.

Thus, in the manner set forth, it is readily understood that we are able to produce motion pictures from puppets and various movable objects in imitation or semblance of anything desired; and to do this without the great labor and care heretofore attendant upon the production of such motion picture plays.

In Fig. 5 we have illustrated a slightly different mode of holding and supporting an object $21^a$ upon the floor $9^a$. In this case the floor may be provided with a surfacing of some plastic or similar material 50; and pins or studs $14^a$ may enter into this material so as to hold the object $21^a$ in any desired position on the floor. In using this method we prefer to use a floor sheet 51, which may be in the nature of a carpet, or in the nature of a paper sheet; upon which floor sheet movement lines $31^a$ may be placed in duplication of the movement lines $32^a$ on the plan sheet shown in Fig. 3. The floor sheet 51 may or may not bear reference marks $31^a$ corresponding with those of the plan sheet; and in this case the original plan of movement may be made directly on the floor sheet 51 if so desired. The objects of the play may be moved around on the floor in the same manner as before described, step by step, an exposure being taken after each step of movement.

In Figs. 7 and 8 we have shown different methods of holding the objects on the floor in certain set positions. In Fig. 7 we show the floor $9^b$ having a floor sheet $51^b$ thereon; and the objects, such as shown at $21^b$, may have vacuum cups 60 on their under sides, by which they may be easily held to the surface sheet $31^b$, or to the floor. The use, with the vacuum cups, of the floor sheet 51 or 51ᵇ facilitates the accurate movement of the objects; the line of movement, being noted directly upon the floor sheet, is easily followed and the objects easily moved thereon without reference to the plan sheet, as shown in Fig. 3, and without the necessity of ascertaining the position of the objects by reference to the coördinate lines 11, as in Fig. 1. One advantage of the vacuum cups is that they will hold to a floor or surface which is perfectly smooth. Thus a floor of plate glass may be used; which glass, being invisible, allows of certain striking lighting effects.

It will be understood that it is only necessary to have on the plane of reference, formed in this case by the floor sheet 51, a mark or set of marks by which the objects, manikins, puppets, etc., may be definitely placed and moved along the definite lines of movement, or by which the track of the object may be recorded; so that, in the finished motion picture the movement shall appear to be natural, smooth and continuous, fast or slow, or exaggerated, or grotesque, as may be desired, and so that any position may be re-assumed by the puppets, etc. This essential is met by the form in which we use a plastic working floor, as clay. Such a floor may be used with or without the floor sheet; and in either case the objects when moved about leaves marks (where the supporting pins have entered) which show their prior positions and enables the director or his attendants to easily see the amount and direction of each movement.

In Fig. 8 we show a magnetic means of holding the objects to the floor in any desired position. In this figure the object 21ᶜ is shown equipped with a magnetic plate 60 on its under side, said plate being attracted by any one or more of magnets 61, which may be energized to hold the object in any desired position. The magnets are set on the floor 9ᶜ on the coördinate reference marks or lines 11ᶜ, as shown in Fig. 9; so that any particular position may be identified and the object set in that position and then held therein by magnetic action. Or the floor may be covered with a floor sheet as is shown in Fig. 6, upon which floor sheet the line of movement 32ᵃ may be laid out; and if the floor sheet is of thin paper or the like the magnetic action will efficiently hold the object through the sheet.

It will be understood that any of the objects used in such plays as herein described may be moved in any manner desired. For some purposes they may be moved by hand, attendants entering upon the stage after each motion picture exposure and moving and setting the objects for the next exposure. However, the objects may be moved in any other suitable manner, either mechanically or electro-magnetically. For instance, in Fig. 10 we have indicated a means of moving objects magnetically. In this figure there is illustrated an object 22ᵈ which may be mounted upon rollers 70, one of which 70ᵃ may be of magnetic material so as to be attractable by the magnets 61ᵈ. In the position shown, it is assumed that the magnet 61ᵈ which is directly under the roller 70ᵃ has been energized, and may be so energized by the switch arm 72 being thrown to such position as to connect an electric circuit to this particular magnet. If it is desired to move the object 22ᵈ to the right in Fig. 10 the next magnet 61ᵈ to the right, may be energized by moving the switch arm 72, when the magnet roller 70ᵃ will be attracted by said last magnet and the object 22ᵈ will be thereby moved. In such a manner the object 22ᵈ may be moved to any position desired step by step, over the whole floor. Furthermore, the attitude of different objects may be changed electro-magnetically. In Fig. 10 we have shown an object 21ᵈ in the form of a puppet, representing, say, a dog. Electro-magnetic means may be employed for moving any of the component parts of the puppet; as, for instance, an electro-magnet 80 may be employed for moving the dog's tail 81, said electro-magnet being connected by wires 82 to any sort of electric current through the switch 83.

Another feature possible in our method is that of having the puppet appear to talk, in the same manner as in a cartoon drawing. At any time during the action a "baloon" may be attached to the puppet, in the form of a frame or the like carrying words of conversation, etc. This is illustrated in Fig. 10. A wire frame 100 of such color as to be invisible in the photograph, is suspended in the dog's mouth and characters 101 are supported in the frame. The characters may be removably fixed on the frame; so that the words may be spelled out by adding successive characters one after another; so that the words may appear to gradually come out of the mouth.

It will now be understood that our invention involves primarily a method and an apparatus for producing motion picture plays of objects and representations which have heretofore been made with difficulty; and particularly for producing motion picture puppet plays. The inanimate objects, in representations of persons, animals, etc., may be made by any suitable means, step by step, and may also be moved step by step to take different attitudes, to make different gestures and assume different expressions, all of which is impossible of attainment by living representations. And it is one of the great advantages of our method that grotesque, exaggerated representations may be made which cannot be represented by living animals or persons and which have only heretofore been made in laborious and exacting fashion.

We do not wish to limit our invention specifically to the forms of apparatus herein set forth; but to broadly define our invention in general terms of those essentials which appear herein.

Having described a preferred form of our invention, we claim:

1. Apparatus for production of motion picture puppet plays, embodying a plane of support and reference, movable objects, and a plurality of object holding means in coördinate arrangement on the plane into coöperative relation with any of which the movable objects may be placed, the objects having means for engaging said holding means whereby the object may be held successively in different positions which are made definite and known by the coördination of the holding means.

2. Apparatus for production of motion picture puppet plays, embodying a plane of support and reference, movable objects, a plurality of coördinate position reference marks on said plane, and the objects having means adapted to engage the plane to hold the objects in position thereon, the position of any object being determined and ascertained by reference to the coördinate reference marks.

3. Apparatus for production of motion picture puppet plays, embodying a plane of support and reference, movable objects, each having a pin, and the plane having a plurality of object holding apertures placed in coördinate arrangement thereon and adapted to receive the object pin, whereby the object may be held successively in different positions which are made definite and known by the coördination of the holding means.

In witness that we claim the foregoing we have hereunto subscribed our names this 12th day of October, 1915.

R. F. TAYLOR.
W. W. WHEATLY.

Witness:
EDWARD H. BARKELEW.